US012217648B2

(12) United States Patent
Tan et al.

(10) Patent No.: US 12,217,648 B2
(45) Date of Patent: Feb. 4, 2025

(54) ADJUSTMENT OF DISPLAY PANEL

(71) Applicant: TCL CHINA STAR OPTOELECTRONICS TECHNOLOGY CO., LTD., Shenzhen (CN)

(72) Inventors: Wenhao Tan, Shenzhen (CN); Wennuo Huang, Shenzhen (CN)

(73) Assignee: TCL CHINA STAR OPTOELECTRONICS TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 18/518,993

(22) Filed: Nov. 26, 2023

(65) Prior Publication Data

US 2024/0355255 A1 Oct. 24, 2024

(30) Foreign Application Priority Data

Apr. 20, 2023 (CN) ......................... 202310470944.4

(51) Int. Cl.
*G09G 3/20* (2006.01)

(52) U.S. Cl.
CPC ......... *G09G 3/2007* (2013.01); *G09G 3/2092* (2013.01); *G09G 2320/0285* (2013.01); *G09G 2320/0626* (2013.01); *G09G 2320/0673* (2013.01)

(58) Field of Classification Search
CPC ......... G09G 3/2007; G09G 2320/0233; G09G 2320/0285; G09G 2320/0626; G09G 2320/0673; G09G 2360/16
See application file for complete search history.

(56) References Cited

U.S. PATENT DOCUMENTS

2024/0112616 A1* 4/2024 Han ..................... G09G 3/3225

* cited by examiner

*Primary Examiner* — Priyank J Shah
(74) *Attorney, Agent, or Firm* — The Roy Gross Law Firm, LLC; Roy Gross

(57) ABSTRACT

This disclosure provides an adjustment method of a display panel, including: obtaining one or more gamma voltages respectively corresponding to binding points of an extreme grey scale of the display panel as one or more first gamma voltages; obtaining one or more gamma voltages respectively corresponding to binding points of a secondary grey scale adjacent to the extreme grey scale as second gamma voltages; adjusting the gamma voltages corresponding to binding points of the secondary grey scale based on the first gamma voltages and the second gamma voltages to obtain one or more target gamma voltages of the binding points of the secondary grey scale; and adjusting a grey scale value of the extreme grey scale in a preset grey scale-ACC LUT of the display panel, so that a brightness value of the secondary grey scale in the preset grey scale-ACC LUT reaches a target brightness value.

20 Claims, 7 Drawing Sheets

| | 0 | 16 | 32 | 48 | 64 | 80 | 96 | 112 | 128 | 144 | 160 | 176 | 192 | 208 | 224 | 240 | 255 |
|---|---|---|---|---|---|---|---|---|---|---|---|---|---|---|---|---|---|
| 0 | 0 | 0 | 0 | 0 | 0 | 0 | 0 | 0 | 0 | 0 | 0 | 0 | 0 | 0 | 0 | 0 | 0 |
| 16 | 210 | 64 | 36 | 28 | 26 | 26 | 26 | 18 | 18 | 18 | 18 | 18 | 12 | 8 | 8 | 6 | 4 |
| 32 | 340 | 216 | 128 | 95 | 71 | 55 | 47 | 39 | 39 | 31 | 31 | 23 | 23 | 23 | 17 | 17 | 10 |
| 48 | 430 | 304 | 238 | 192 | 162 | 138 | 122 | 106 | 82 | 74 | 58 | 50 | 50 | 44 | 40 | 30 | 18 |
| 64 | 512 | 410 | 304 | 284 | 256 | 221 | 205 | 189 | 165 | 149 | 133 | 117 | 93 | 73 | 61 | 57 | 39 |
| 80 | 580 | 480 | 404 | 360 | 348 | 320 | 290 | 274 | 250 | 234 | 210 | 189 | 168 | 134 | 118 | 118 | 90 |
| 96 | 645 | 538 | 464 | 440 | 424 | 408 | 384 | 362 | 338 | 314 | 290 | 274 | 250 | 219 | 195 | 191 | 146 |
| 112 | 700 | 584 | 568 | 552 | 536 | 520 | 504 | 448 | 432 | 408 | 384 | 360 | 336 | 320 | 278 | 254 | 244 |
| 128 | 750 | 684 | 660 | 636 | 612 | 588 | 564 | 540 | 512 | 496 | 480 | 456 | 440 | 408 | 374 | 342 | 332 |
| 144 | 795 | 758 | 734 | 718 | 694 | 670 | 646 | 622 | 598 | 576 | 560 | 536 | 512 | 488 | 472 | 440 | 416 |
| 160 | 830 | 812 | 796 | 780 | 764 | 748 | 724 | 708 | 684 | 670 | 640 | 624 | 608 | 592 | 568 | 536 | 496 |
| 176 | 860 | 856 | 852 | 836 | 828 | 812 | 796 | 780 | 756 | 740 | 708 | 704 | 688 | 664 | 648 | 616 | 584 |
| 192 | 890 | 876 | 876 | 876 | 876 | 876 | 860 | 844 | 828 | 812 | 796 | 772 | 768 | 752 | 736 | 712 | 680 |
| 208 | 920 | 920 | 920 | 920 | 920 | 920 | 920 | 920 | 912 | 904 | 888 | 872 | 856 | 832 | 816 | 800 | 776 |
| 224 | 960 | 960 | 960 | 960 | 960 | 960 | 960 | 960 | 960 | 952 | 944 | 936 | 928 | 912 | 896 | 880 | 864 |
| 240 | 990 | 990 | 990 | 990 | 990 | 990 | 990 | 990 | 990 | 990 | 990 | 990 | 990 | 984 | 976 | 960 | 952 |
| 255 | 1023 | 1023 | 1023 | 1023 | 1023 | 1023 | 1023 | 1023 | 1023 | 1023 | 1023 | 1023 | 1023 | 1023 | 1023 | 1023 | 1023 |

FIG. 1

ADJUSTMENT OF DISPLAY PANEL

CROSS-REFERENCE TO RELATED APPLICATION

This application claims priority to and the benefit of Chinese Patent Application No. 202310470944.4, filed on Apr. 20, 2023, the disclosure of which is incorporated herein by reference in its entirety.

TECHNICAL FIELD

The present disclosure relates to display panel technologies, and more particularly, to adjustment methods of a display panel, control chips, and display terminals.

BACKGROUND

During driving of a display panel, the liquid crystal capacitor may not vary as fast as the varying external merchant voltage due to the slow liquid crystal response time, and it is difficult for the liquid crystal molecules to achieve an expected deflection angle within one frame, which causes the display brightness to fail to reach an expected brightness value, and dynamic images appear to be smearing, thereby affecting a display effect.

Generally, an over-drive technology (OD) is used for grey scale compensation, so that the liquid crystal reaches an expected deflection angle in a short time. However, the over-drive look-up table (OD LUT), as shown in the illustrative FIG. 1, has set a maximum value of 1023 (10 bits) and a minimum value of 0, and therefore the OD LUT related to grey scales L255 and L0 cannot provide a greater value or a smaller value, and is generally regarded as unadjustable by default. This limits the adjustment possibilities of the OD LUT in a response time interval (ton-toff), and even leads to a failure in adjusting the response time, thereby affecting the display effect of the display panel.

SUMMARY

In a first aspect, the present disclosure provides an adjustment method of a display panel. The method may include: obtaining one or more gamma voltages respectively corresponding to one or more first binding points as one or more first gamma voltages, the first binding points being binding points of an extreme grey scale of the display panel; obtaining one or more gamma voltages respectively corresponding to one or more second binding points as one or more second gamma voltages, the second binding points being binding points of a secondary grey scale of the display panel, wherein the secondary grey scale is adjacent to the extreme grey scale in a preset display grey scale table; adjusting the one or more gamma voltages corresponding to the one or more second binding points based on the one or more first gamma voltages and the one or more second gamma voltages to obtain one or more target gamma voltages of the one or more second binding points; and a grey scale value of the extreme grey scale in a preset grey scale-accurate color capture look-up table (ACC LUT) of the display panel, so that a brightness value of the secondary grey scale in the preset grey scale-ACC LUT reaches a target brightness value, the target brightness value being a brightness value of the extreme grey scale.

In a second aspect, the present disclosure provides a control chip. The control chip includes a communication interface and a control circuit. The communication interface is configured to obtain one or more gamma voltages respectively corresponding to one or more first binding points as one or more first gamma voltages and one or more gamma voltages respectively corresponding to one or more second binding points as one or more second gamma voltages, wherein the first binding points are binding points of an extreme grey scale of the display panel, and the second binding points are binding points of a secondary grey scale of the display panel, the secondary grey scale being adjacent to the extreme grey scale in a preset display grey scale table. The control circuit is configured to adjust the one or more gamma voltages corresponding to the one or more second binding points based on the one or more first gamma voltages and the one or more second gamma voltages to obtain one or more target gamma voltages of the one or more second binding points, and to adjust a grey scale value of the extreme grey scale in a preset grey scale-accurate color capture look-up table (ACC LUT) of the display panel, so that a brightness value of the secondary grey scale in the preset grey scale-ACC LUT reaches a target brightness value, the target brightness value being a brightness value of the extreme grey scale.

In a third aspect, the present disclosure further provides a display terminal. The display terminal includes a display panel, a processor; and a memory electrically connected to the processor and including a plurality of application programs. The processor is configured to execute the application programs to implement an adjustment method of the display panel. The method may include: obtaining one or more gamma voltages respectively corresponding to one or more first binding points as one or more first gamma voltages, the first binding points being binding points of an extreme grey scale of the display panel; obtaining one or more gamma voltages respectively corresponding to one or more second binding points as one or more second gamma voltages, the second binding points being binding points of a secondary grey scale of the display panel, wherein the secondary grey scale is adjacent to the extreme grey scale in a preset display grey scale table; adjusting the one or more gamma voltages corresponding to the one or more second binding points based on the one or more first gamma voltages and the one or more second gamma voltages to obtain one or more target gamma voltages of the one or more second binding points; and a grey scale value of the extreme grey scale in a preset grey scale-accurate color capture look-up table (ACC LUT) of the display panel, so that a brightness value of the secondary grey scale in the preset grey scale-ACC LUT reaches a target brightness value, the target brightness value being a brightness value of the extreme grey scale.

BRIEF DESCRIPTION OF THE DRAWINGS

Technical solutions and beneficial effects of the present disclosure will be apparent through a detailed description of some specific embodiments of the present disclosure in conjunction with the accompanying drawings.

FIG. 1 is a schematic diagram of an over-drive look-up table according to some embodiments of the present disclosure.

DETAILED DESCRIPTION

Figure 2:
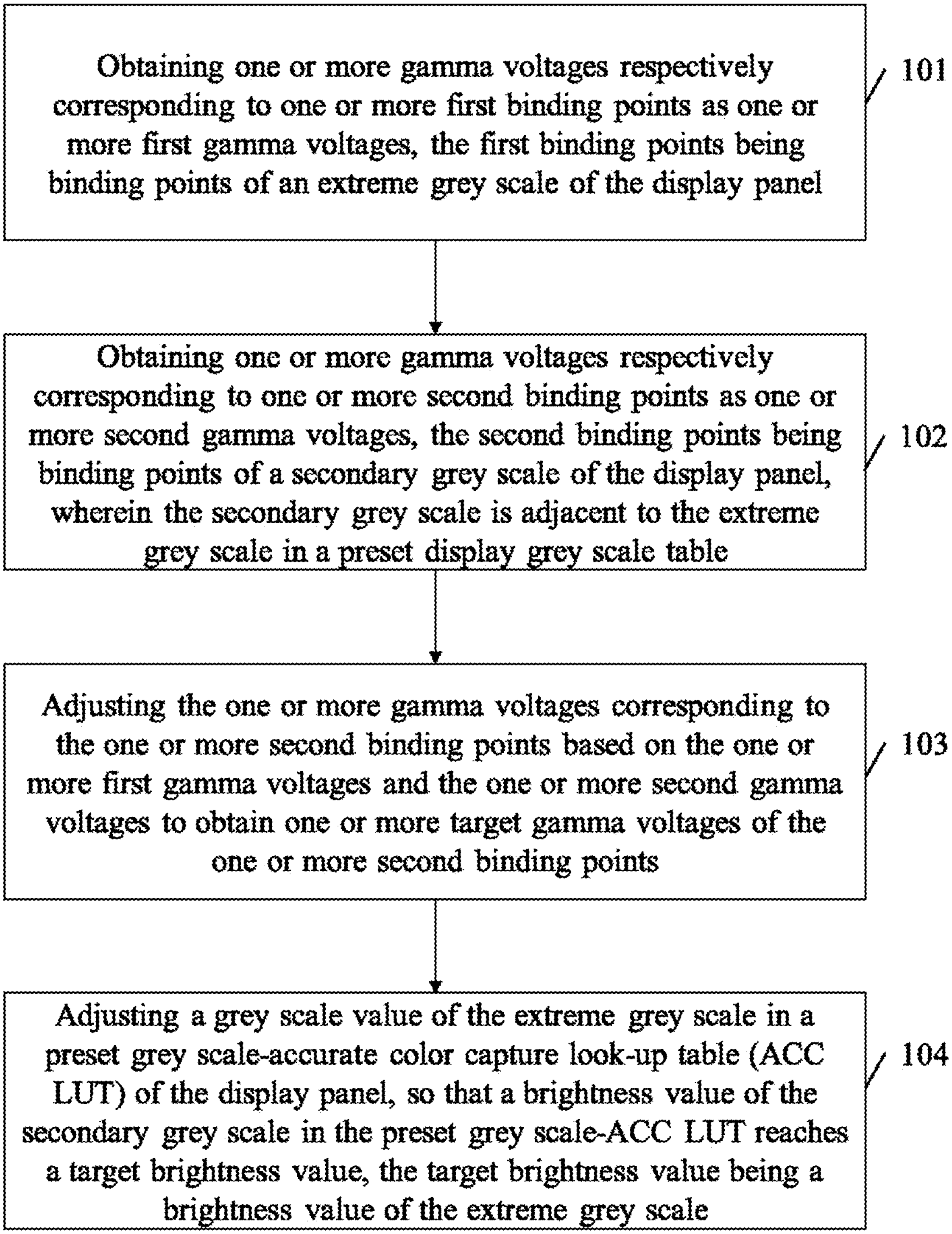
FIG. 2 is a schematic flowchart of an adjustment method of a display panel according to some embodiments of the present disclosure.

Specific structural and functional details disclosed herein are representative only and are included for the purpose of describing exemplary embodiments of the present disclosure. However, the present disclosure may be embodied in many alternative forms and should not be construed to be limited only to the embodiments set forth herein.

In the description of the present disclosure, it should be understood that orientations or positional relationships indicated by the terms "center", "lateral", "upper", "lower", "left", "right", "vertical", "horizontal", "top", "bottom", "inner", "outer", etc., are based on orientations or positional relationships shown in the drawing. These terms are merely for the convenience of describing the present disclosure and simplifying the description, rather than indicating or implying a device or an element referred to must have a specific orientation or must be constructed and operated in a specific orientation, and therefore are not to be construed as limitations on the present disclosure. In addition, the terms "first" and "second" are used for descriptive purposes only and cannot be understood as indicating or implying relative importance or implicitly indicating the quantity of indicated technical features. Therefore, features defined by "first" and "second" may explicitly or implicitly include one or more of these features. In the description of the present disclosure, unless otherwise stated, "plurality" means two or more. In addition, the term "include" and any variations thereof are intended to cover non-exclusive inclusions.

In the description of the present disclosure, it should be noted that, unless otherwise clearly stated and limited, the terms "mount", "joint", and "connect" should be understood in a broad sense. For example, these terms can refer to: a support connection, a detachable connection, or an integral connection; a mechanical connection, or an electrical connection; a direct connection, an indirect connection through an intermediate medium, or an internal connection between two components. For those of ordinary skill in the art, the specific meanings of the above terms in the present disclosure can be understood according to actual conditions.

The terminology used herein is for the purpose of describing particular embodiments only and is not intended to be limiting of the exemplary embodiments. As used herein, the singular forms "a" and "an" are intended to include the plural referents as well, unless the context clearly dictates otherwise. It will also be understood that the terms "include" and/or "comprise" as used herein specify the presence of stated features, integers, steps, operations, units, and/or components without excluding the presence or addition of one or more other characteristics, integers, steps, operations, units, components and/or combinations thereof.

The present disclosure will be further described below in conjunction with the accompanying drawings and embodiments.

As shown in FIG. 2, some embodiments of the present disclosure provide an adjustment method of a display panel. The adjustment method of the display panel may include the following operations.

In operation 101, one or more gamma voltages respectively corresponding to one or more first binding point are obtained as one or more first gamma voltages. The first binding points are binding points of an extreme grey scale of the display panel.

As used herein, a grey scale refers to a display grey scale value of a pixel of the display panel, which is generally between 0 and 255. The extreme grey scale may be a maximum grey scale value, a minimum grey scale value, or a combination thereof. For example, the extreme grey scale may be 0, 255, or a combination of 255 and 0.

Generally, in a design of a display panel, the display panel is equipped with 7 pairs of essentially independent binding points, that is, gm1, gm2, . . . , gm14, and each binding point corresponds to a gamma voltage. Taking an extreme grey scale 0 (L0) as an example, the corresponding first binding points are gm7 and gm8. The first gamma voltage corresponding to gm7 is a positive frame voltage, and the first gamma voltage corresponding to gm8 is a negative frame voltage. Taking an extreme grey scale 255 (L255) as an example, the corresponding first binding points are gm1 and gm14. The first gamma voltage corresponding to gm1 is a positive frame voltage, and the first gamma voltage corresponding to gm14 is a negative frame voltage.

In some embodiments, the first gamma voltages respectively corresponding to the first binding points may be obtained from a preset correlation table between preset identifications and gamma voltages of binding points based on an identification of the display panel. A process for obtaining the first gamma voltages includes: obtaining, from the correlation table, one or more binding points corresponding to the extreme grey scale (the maximum grey scale and/or the minimum grey scale) as the first binding points, and determining one or more gamma voltages respectively corresponding to the first binding points as the first gamma voltages. As shown in Table 1, which is a gamma voltage table corresponding to binding points of a display panel, gamma1-gamma14 are gamma voltages of the binding points gm 1-gm 14, respectively. It can be seen from the table that the first gamma voltages may be at least one of 11.926 V, 0.25 V, 7.197 V, or 5.602 V.

TABLE 1

| the gamma voltage table corresponding to the binding points of the display panel: Voltage | | | |
|---|---|---|---|
| gamma1 | 11.926 | gamma14 | 0.25 |
| gamma2 | 11.87 | gamma13 | 0.444 |
| gamma3 | 10.511 | gamma12 | 1.761 |
| gamma4 | 9.457 | gamma11 | 2.871 |
| gamma5 | 8.889 | gamma10 | 3.605 |
| gamma6 | 7.28 | gamma9 | 5.519 |
| gamma7 | 7.197 | gamma8 | 5.602 |

In operation 102, one or more gamma voltages respectively corresponding to one or more second binding points are obtained as one or more second gamma voltages. The second binding points are binding points of a secondary grey scale of the display panel. The secondary grey scale is adjacent to the extreme grey scale in a preset display grey scale table.

The secondary grey scale is adjacent to the extreme grey scale in the preset display grey scale table, that is, a difference between the secondary grey scale and the extreme grey scale is a step size of the grey scale values in the preset display grey scale table.

The preset display grey scale table refers to a table, which is preset to record grey scales arranged in an order that magnitudes of display grey scale values thereof increase/decrease at a preset step size. For example, the display grey scale table may be a table with 1 row and 256 columns, where the display grey scale values are 0-255, and the step size is 1. A grey scale adjacent to the grey scale 0 (L0) is L1, a grey scale adjacent to the grey scale 255 (L255) is L254. That is, the secondary grey scale may be 1, 254, or a combination of 254 and 1.

The second binding points are the binding points of the secondary grey scale, and the gamma voltages respectively corresponding to the second binding points are the second gamma voltages. Taking a secondary grey scale 1 (L1) as an example, the corresponding second binding points are gm6 and gm9, the second gamma voltage corresponding to gm6 is a positive frame voltage, and the second gamma voltage corresponding to gm9 is a negative frame voltage. Taking a secondary grey scale 254 (L254) as an example, the corresponding second binding points are gm2 and gm13. The second gamma voltage corresponding to gm2 is a positive frame voltage, and the second gamma voltage corresponding to gm13 is a negative frame voltage.

In some embodiments, the second gamma voltages may be obtained in a similar manner for obtaining the first gamma voltages, which will not be repeated herein.

Still, taking Table 1 as an example, the second gamma voltages may be at least one of 7.25 V, 5.519 V, 11.87 V, or 0.444 V.

In operation 103, based on the first gamma voltages and the second gamma voltages, the gamma voltages corresponding to the second binding points are adjusted to obtain one or more target gamma voltages of the second binding points.

The target gamma voltages are adjusted gamma voltages of the second binding points, and voltage differences between the target gamma voltages trigger an over drive (OD) effect.

In general, since an over-drive look-up table (OD LUT) cannot give larger or smaller values to the extreme grey scale (such as L255 and L0), an adjusted grey scale does not have a corresponding overvoltage value, thereby resulting a failure of adjustment. Therefore, in some embodiments, the gamma voltages of the second binding points of the secondary grey scale are adjusted based on the first gamma voltages corresponding to the extreme grey scale and the second gamma voltages corresponding to the secondary grey scale. The gamma voltages corresponding to the second binding points may be adjusted by directly adjusting the gamma voltages of the secondary grey scale to the first gamma voltages or performing an interpolation operation based on the first gamma voltages and the second gamma voltages to obtain the target gamma voltages of the second binding points.

It should be understood that, in some embodiments, the gamma voltages of the secondary grey scale are adjusted based on the gamma voltages of the extreme grey scale and the gamma voltages of the secondary grey scale, so that the extreme grey scale searched based on the OD LUT has the corresponding overvoltage value.

In operation 104, a grey scale value of the extreme grey scale in a preset grey scale-accurate color capture look-up table (ACC LUT) of the display panel is adjusted, so that brightness value of the secondary grey scale in the preset grey scale-ACC LUT reaches target brightness value. The target brightness value is brightness value of the extreme grey scale.

The preset grey scale-ACC LUT is an ACC LUT of the display panel, where one grey scale value corresponds to one brightness value. Adjustment of the grey scale value refers to adjusting a grey scale value in the ACC LUT, including reducing the grey scale value and increasing the grey scale value.

In some embodiments, the extreme grey scale may be adjusted based on the brightness value of the secondary grey scale and the brightness value of the extreme grey scale, so that the brightness value of the secondary grey scale is the same as or close to the brightness value of the extreme grey scale. Therefore, for the extreme grey scale L255, the adjusted grey scale value of L255 is less than 255, and the adjustment has been performed by reducing the grey scale value; and for the extreme grey scale L0, the adjusted grey scale value of L0 is greater than 0, and the adjustment has been performed by increasing the grey scale value. In some embodiments, the gamma voltages of the second binding points are directly adjusted to the first gamma voltages in the operation 103, and the extreme grey scale may be directly adjusted to the secondary grey scale in the operation 104, so that the brightness value of the secondary grey scale is the same as or close to the brightness value of the extreme grey scale, thereby releasing gamma voltages of the extreme grey scale. In this way, a pixel of the display panel corresponding to the extreme grey scale does not function to display, thereby improving display effect of the display panel. Meanwhile, since each grey scale in the OD LUT remains unchanged, the extreme grey scale has an adjustment possibility, which enables over-drive driving of an overvoltage required for the extreme grey scale, thereby reducing a response time of the pixels of the display panel.

In some embodiments of the present disclosure, the extreme grey scale includes the maximum grey scale of the display panel in the preset grey scale-ACC LUT, the first binding points include binding points of the maximum grey scale of the display panel, the first gamma voltages include gamma voltages of the binding points of the maximum grey scale, the second binding points include a binding points adjacent to the maximum grey scale of the display panel in the preset grey scale-ACC LUT, and the second gamma voltages include gamma voltages of the binding point adjacent to the maximum grey scale.

In some embodiments, the extreme grey scale may be the maximum grey scale. For example, the display grey scale values of the display panel are 0-255, and the maximum grey scale thereof is 255 (L255). The first binding points include the binding points (e.g., gm1 and gm14) of the maximum grey scale of the display panel. The first gamma voltages include the gamma voltages (e.g., the gamma voltages corresponding to gm1 and gm14) of the binding points of the maximum grey scale. The second binding points include the binding points (e.g., gm2 adjacent to gm1 and gm13 adjacent to gm14) adjacent to the maximum grey scale of the display panel. The second gamma voltages include the gamma voltages (e.g., the gamma voltages corresponding to gm2 and gm13) of the binding points adjacent to the maximum grey scale.

In some embodiments of the present disclosure, the operation 103 includes: adjusting the gamma voltage(s) of the binding point(s) adjacent to the maximum grey scale to the gamma voltage(s) of the binding point(s) of the maximum grey scale to obtain the target gamma voltage(s) of the second binding point.

Taking the maximum grey scale L255 as an example, the gamma voltages of the second binding points of L254 are adjusted to the respective gamma voltages of the first binding points of L255. That is, the gamma voltage corresponding to gm2 is adjusted to the gamma voltage corresponding to gm1, and the gamma voltage corresponding to gm13 is adjusted to the gamma voltage corresponding to gm14. As shown in Table 2, which is a table of the target gamma voltages of the binding points adjacent to the maximum grey scale, this table is obtained by performing gamma voltage adjustment on the basis of Table 1.

TABLE 2

| the target gamma voltages of the binding points adjacent to the maximum grey scale: Voltage | | | |
|---|---|---|---|
| gamma1 | 13 | gamma14 | 0.1 |
| gamma2 | 11.926 | gamma13 | 0.25 |

It should be understood that, by adjusting the gamma voltages of the binding point adjacent to the maximum grey scale to the gamma voltages of the binding point of the maximum grey scale, a voltage difference between the gamma voltage of the binding point adjacent to the maximum grey scale and the gamma voltage of the binding point of the maximum grey scale is increased, which enables the display panel to provide a higher gamma voltage while ensuring that the maximum grey scale has an adjustment possibility.

In some embodiments of the present disclosure, the operation 104 includes: reducing the maximum grey scale of the display panel in the preset grey scale-ACC LUT to a grey scale value of the secondary grey scale, so that the brightness value of the secondary grey scale in the preset grey scale-ACC LUT reaches the target brightness value.

For example, a brightness value of the first binding points gm1 and gm14 corresponding to the maximum grey scale L255 is 248 nits, which is the maximum brightness value that the display panel can achieve. According to characteristics of the liquid crystal, in order to avoid an undesirable phenomenon (e.g., residual image of a checkerboard pattern) from occurring to the display panel, in some embodiment, the maximum grey scale L255 in the preset grey scale-ACC LUT is adjusted to L254, that is, the value 255 in the ACC LUT is adjusted to 254, which makes the brightness value of L254 to be same as the brightness value of the original L255, ensuring the display effect of the display panel.

In some embodiments of the present disclosure, the extreme grey scale includes the minimum grey scale of the display panel in the preset grey scale-ACC LUT, the second binding points include the binding points of the minimum grey scale of the display panel, the second gamma voltages include the gamma voltages of the binding points of the minimum grey scale, the first binding points include the binding points adjacent to the minimum grey scale of the display panel in the preset grey scale-ACC LUT, and the first gamma voltages include the gamma voltages of the binding points adjacent to the minimum grey scale.

The extreme grey scale may be the minimum grey scale. For example, the display grey scale values of the display panel are 0-255, and the minimum grey scale thereof is 0 (L0). The first binding points include the binding points (e.g., gm7 and gm8) of the minimum grey scale of the display panel. The first gamma voltages include the gamma voltages (e.g., the gamma voltages corresponding to gm7 and gm8) of the binding points of the minimum grey scale. The second binding points include the binding points (e.g., gm6 adjacent to gm7 and gm9 adjacent to gm8) adjacent to the minimum grey scale of the display panel. The second gamma voltages include the gamma voltages (e.g., the gamma voltages corresponding to gm6 and gm9) of the binding points adjacent to the minimum grey scale.

In some embodiments of the present disclosure, the operation 103 includes: adjusting the gamma voltage(s) of the binding point(s) adjacent to the minimum grey scale to the gamma voltage(s) of the binding point(s) of the minimum grey scale to obtain the target gamma voltage(s) of the second binding points.

Taking the minimum grey scale L0 as an example, the gamma voltages of the second binding points of L1 are adjusted to the respective gamma voltages of the first binding points of L0. That is, the gamma voltage corresponding to gm6 is adjusted to the gamma voltage corresponding to gm7, and the gamma voltage corresponding to gm9 is adjusted to the gamma voltage corresponding to gm8. As shown in Table 3, which is a table of the target gamma voltages of the binding points adjacent to the minimum grey scale, this table is obtained by performing gamma voltage adjustment on the basis of Table 1.

TABLE 3

| the target gamma voltages of the binding points adjacent to the maximum grey scale: Voltage | | | |
|---|---|---|---|
| gamma6 | 7.197 | Gamma9 | 5.602 |
| gamma7 | 6.5 | Gamma8 | 6 |

It should be understood that in is embodiment, by adjusting the gamma voltages of the binding points adjacent to the minimum grey scale to the gamma voltages of the binding points of the minimum grey scale, the minimum grey scale has an adjustment possibility.

In some embodiments of the present disclosure, the operation 104 includes: increasing the minimum grey scale of the display panel in the preset grey scale-ACC LUT to a grey scale value of the secondary grey scale, so that the brightness value of the secondary grey scale in the preset grey scale-ACC LUT reaches the target brightness value.

For example, a brightness value of the first binding points gm7 and gm8 corresponding to the maximum grey scale L0 is 0.0437 nits, which is the minimum brightness value that the display panel can achieve. According to characteristics of the liquid crystal, in order to avoid an undesirable phenomenon (e.g., residual image of a checkerboard pattern) from occurring to the display panel, in some embodiment, the minimum grey scale L0 in the preset grey scale-ACC LUT is adjusted to L1, that is, the value 0 in the ACC LUT is adjusted to 1, which makes the brightness value of L1 to be same as the brightness value of the original L0, ensuring the display effect of the display panel.

Figure 3:
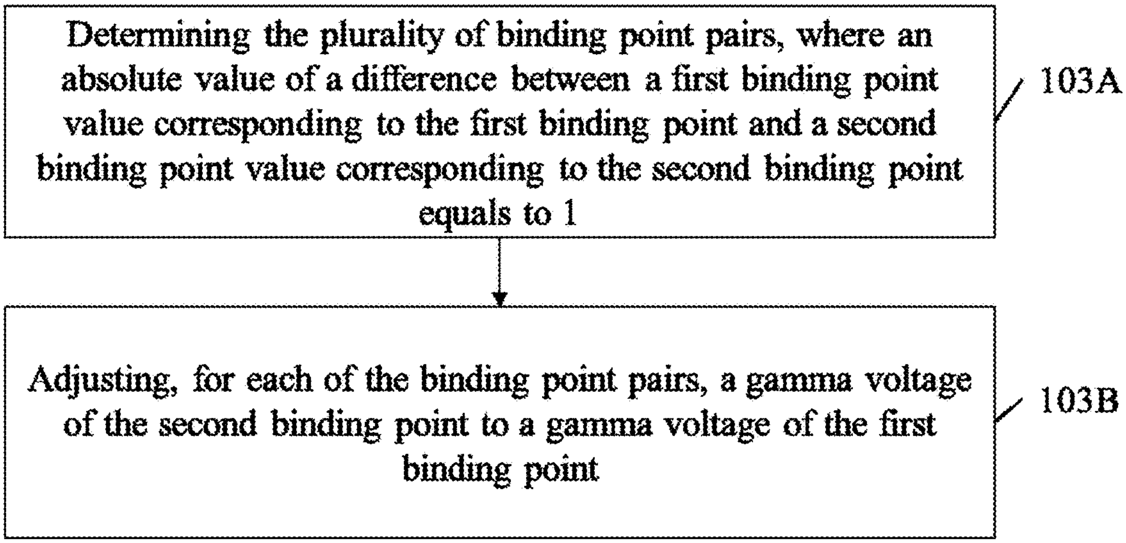
FIG. 3 is a schematic flowchart of another adjustment method of a display panel according to some embodiments of the present disclosure.

As shown in FIG. 3, in some embodiments of the present disclosure, the first binding points respectively correspond to one or more first binding point values, and the second binding points respectively correspond to one or more second binding point values. In some embodiments, the first binding points and the second binding points include a plurality of binding point pairs, wherein each of the plurality of binding point pairs includes one first binding point and one second binding point. In such case, the operation 103 includes:

in operation 103A, determining the plurality of binding point pairs, where an absolute value of a difference between a first binding point value corresponding to the first binding point and a second binding point value corresponding to the second binding point equals to 1; and in operation 103B, adjusting, for each of the binding point pairs, a gamma voltage of the second binding point to a gamma voltage of the first binding point.

A binding point pair is a combination of one first binding point and one second binding point, that is, a binding point of the extreme grey scale and a binding point of the secondary grey scale. Whether a first binding point and a second binding point belongs to one binding point pair may be determined based on a determination whether an absolute value of a difference between the binding point values of the first binding point and the second binding point equals to 1. Due to a design of the display panel, when the absolute value of the difference between the binding point values of the first binding point and the second binding point is 1, it may be ensured that one binding point in the extreme grey scale corresponds to a binding point of the secondary grey scale, thus ensuring the accuracy of the subsequent gamma voltage adjustment of the corresponding binding points.

For example, there are four binding point pairs, which are G1 (gm1, gm2), G2 (gm7, gm6), G3 (gm8, gm9), and G4 (gm14, gm13) respectively. In such case, the adjusting of the gamma voltages corresponding to the second binding points based on the first gamma voltages and the second gamma voltages includes: adjusting the gamma voltage corresponding to gm2 to the gamma voltage corresponding to gm1, adjusting the gamma voltage corresponding to gm6 to the gamma voltage corresponding to gm7, adjusting the gamma voltage corresponding to gm9 to the gamma voltage corresponding to gm8, and adjusting the gamma voltage corresponding to gm13 to the gamma voltage corresponding to gm14. In this way, the gamma voltages of the binding points respectively corresponding to the maximum grey scale and the minimum grey scale in the extreme grey scale have been adjusted, thereby improving an adjustment efficiency of the display panel.

According to some embodiments, the present disclosure provides an adjustment method of the display panel, including: obtaining one or more gamma voltages respectively corresponding to one or more first binding points as one or more first gamma voltages, the first binding points being binding points of an extreme grey scale of the display panel; obtaining one or more gamma voltages respectively corresponding to one or more binding points of a secondary grey scale as one or more second gamma voltages, where the secondary grey scale is adjacent to the extreme grey scale; adjusting one or more gamma voltages corresponding to the binding points of the secondary grey scale based on the first gamma voltages and the second gamma voltages to obtain one or more target gamma voltages of the binding points of the secondary grey scale; and adjusting a grey scale value of the extreme grey scale in a preset grey scale-ACC LUT of the display panel, so that a brightness value of the secondary grey scale in the preset grey scale-ACC LUT reaches a target brightness value (referred to as "brightness penetration" of the extreme grey scale). In addition, the grey scales in the preset grey scale-ACC LUT are adjusted according to the brightness penetration effect, and a gamma voltage between the binding points corresponding to the extreme grey scale is released for adjustment, so that the OD LUT provides an adjustment possibility for the extreme grey scale, which reduces response times of the pixels of the display panel.

Figure 4:
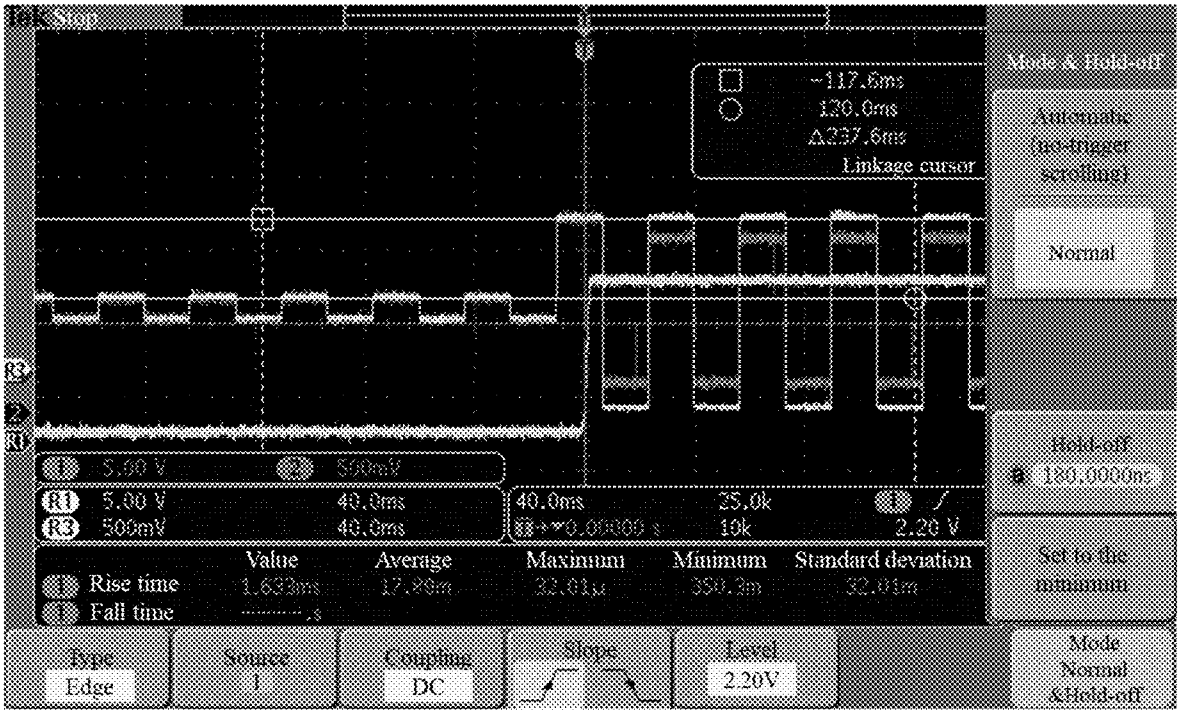
FIG. 4 is a waveform diagram showing adjustment of a display panel according to some embodiments of the present disclosure.

In an example, as shown in FIG. 4, which is a waveform diagram of adjustment of the display panel, a grey line represents a data voltage of acc on/od on, a white line represents a data voltage of acc off/od off. When the brightness value (a white line triggered by a rising edge) increases from 0 to 255, the grey line triggers OD in a first frame, and then stabilizes at data corresponding to L255 in a corresponding ACC LUT. As can be seen from the figure, by using the adjustment method in some embodiments of the present disclosure, L255 and L0 may be adjusted, thereby solving a technical problem of limited adjustment possibility in the related art.

In another example, for a 238-2 165 hz display panel, Table 4 and Table 5 respectively show response times of pixels of the display panel that is adjusted using an existing OD LUT technology or using the adjustment method of the display pane according to some embodiments of the present disclosure:

TABLE 4

Response times of pixels of the display panel adjusted using the OD LUT technology:

| Grey Level | From: 0 | From: 64 | From: 128 | From: 191 | From: 255 |
|---|---|---|---|---|---|
| To: 0 | | 4.798 | 5.031 | 5.555 | 6.85 |
| To: 64 | 52.99 | | 17.11 | 15.13 | 14.96 |
| To: 128 | 30.13 | 11.49 | | 13.27 | 15.55 |
| To: 191 | 13.8 | 7.906 | 6.469 | | 13.58 |
| To: 255 | 10.2 | 6.935 | 5.421 | 4.941 | |

TABLE 5

Response times of pixels of the display panel adjusted using the adjustment method of the display pane according to some embodiments of the present disclosure:

| Grey Level | From: 0 | From: 64 | From: 128 | From: 191 | From: 255 |
|---|---|---|---|---|---|
| To: 0 | | 4.153 | 4.657 | 4.89 | 6.031 |
| To: 64 | 52.99 | | 17.11 | 15.13 | 14.96 |
| To: 128 | 30.13 | 11.49 | | 13.27 | 15.55 |
| To: 191 | 13.8 | 7.906 | 6.469 | | 13.58 |
| To: 255 | 9.13 | 5.82 | 4.824 | 4.013 | |

By comparing the response times in Table 4 and Table 5, it is obvious that the response times of the display panel has been optimized to a large extent.

Correspondingly, some embodiments of the present disclosure also provide a controlling chip 100. In some embodiments, the control chip 100 is a timing controller (Tcon) chip. The control chip 100 is configured to control the adjustment of the preset grey scale-ACC LUT of the display panel, so that adjustment on the display panel according to the adjusted grey scale-ACC LUT can reduce the response times of the pixels of the display panel.

Figure 5:
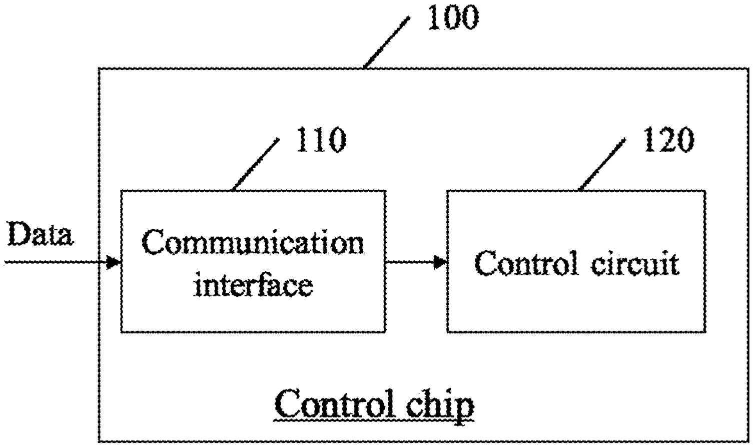
FIG. 5 is a block diagram of a control chip according to some embodiments of the present disclosure.

As shown in FIG. 5, the control chip 100 includes a communication interface 110 and a control circuit 120.

The communication interface 110 is configured to obtain one or more gamma voltages respectively corresponding to one or more first binding points as one or more first gamma voltages and one or more gamma voltages respectively corresponding to one or more second binding points as one or more second gamma voltages, where the first binding points are binding points of an extreme grey scale of the display panel, and the second binding points are binding points of a secondary grey scale of the display panel, the secondary grey scale being adjacent to the extreme grey scale in a preset display grey scale table.

The control circuit 120 is configured to adjust the gamma voltages corresponding to the second binding points based on the first gamma voltages and the second gamma voltages to obtain one or more target gamma voltages of the second binding points, and to adjust a grey scale value of the extreme grey scale in a preset grey scale-accurate color capture look-up table (ACC LUT) of the display panel, so that a brightness value of the secondary grey scale in the preset grey scale-ACC LUT reaches a target brightness value, the target brightness value being a brightness value of the extreme grey scale.

Correspondingly, some embodiments of the present disclosure also provide a display panel adjustment device that can implement all the processes of the adjustment method(s) of the display panel in the above embodiments.

Figure 6:
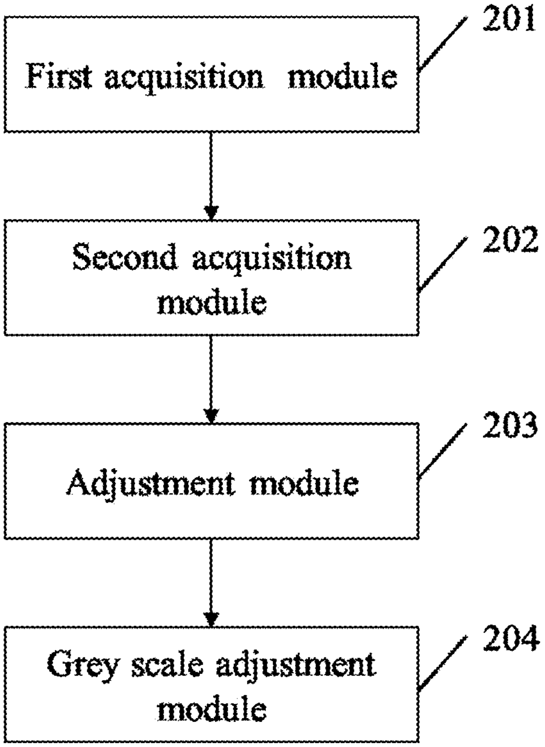
FIG. 6 is a block diagram of a display panel adjustment device according to some embodiments of the present disclosure.

As shown in FIG. 6, the display panel adjustment device according to some embodiments of the present disclosure includes:

a first acquisition module 201 configured to obtain one or more gamma voltages respectively corresponding to one or more first binding points as one or more first gamma voltages, the first binding points being binding points of an extreme grey scale of the display panel;

a second acquisition module 202 configured to obtain one or more gamma voltages respectively corresponding to one or more second binding points as one or more second gamma voltages, the second binding points being binding points of a secondary grey scale of the display panel, where the secondary grey scale is adjacent to the extreme grey scale in a preset display grey scale table;

an adjustment module 203 configured to adjust the gamma voltages corresponding to the second binding points based on the first gamma voltages and the second gamma voltages to obtain one or more target gamma voltages of the second binding points; and a grey scale adjustment module 204 configured to adjust a grey scale value of the extreme grey scale in a preset grey scale-accurate color capture look-up table (ACC LUT) of the display panel, so that a brightness value of the secondary grey scale in the preset grey scale-ACC LUT reaches a target brightness value, the target brightness value being a brightness value of the extreme grey scale.

In some embodiments of the present disclosure, each of the first binding points correspond to a first binding point value, and each of the second binding points correspond to a second binding point value. The first binding points and the second binding points forms a plurality of binding point pairs, where each of the plurality of binding point pairs includes one first binding point and one second binding point. The adjustment module 203 further includes:

an obtaining unit configured to determine the plurality of binding point pairs, in each binding point pair an absolute value of a difference between a first binding point value corresponding to the first binding point and a second binding point value corresponding to the second binding point equals to 1; and an adjustment unit configured to adjust, for each binding point pare, a gamma voltage value of the second binding point to a gamma voltage of the first binding point.

In some embodiments of the present disclosure, the adjustment module 203 further includes:

a first adjustment unit configured to adjust a gamma voltage of a binding point adjacent to a maximum grey scale to a gamma voltage of a binding point of the maximum grey scale to obtain the target gamma voltage of the adjacent binding point.

In some embodiments of the present disclosure, the grey scale adjustment module 204 further includes:

a grey scale reduction unit configured to reduce a grey scale value of the maximum grey scale of the display panel in the preset grey scale-ACC LUT to a grey scale value of the secondary grey scale, so that the brightness value of the secondary grey scale in the preset grey scale-ACC LUT reaches the target brightness value.

In some embodiments of the present disclosure, the adjustment module 203 further includes:

a second adjustment unit configured to adjust a gamma voltage of a binding point adjacent to a minimum grey scale to a gamma voltage of a binding point of the minimum grey scale to obtain the target gamma voltage of the adjacent binding points In some embodiments of the present disclosure, the grey scale adjustment module 204 further includes:

a grey scale increasing unit configured to increase a grey scale value of the minimum grey scale of the display panel in the preset grey scale-ACC LUT to a grey scale value of the secondary grey scale, so that the brightness value of the secondary grey scale in the preset grey scale-ACC LUT reaches the target brightness value.

Figure 7:
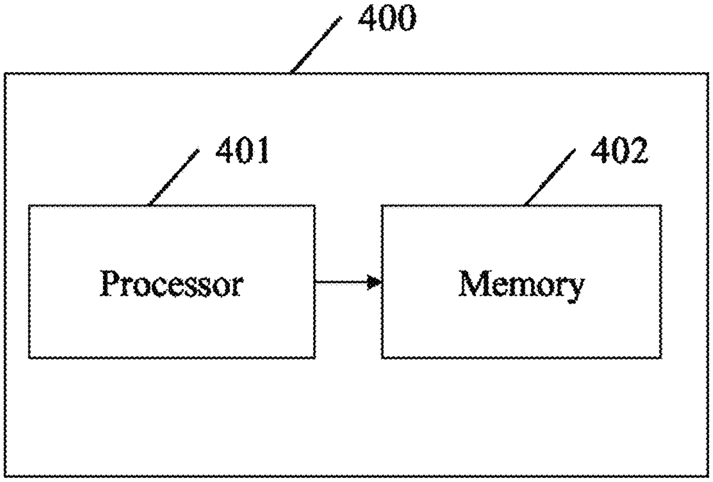
FIG. 7 is a block diagram of a display terminal according to some embodiments of the present disclosure.

In addition, some embodiments of the present disclosure further provide a display terminal, which may be a smart phone, a tablet computer, a television, or other devices. As shown in FIG. 7, the display terminal 400 includes a processor 401 and a memory 402. The processor 401 is electrically connected to the memory 402.

The processor 401 is a control center of the display terminal 400, which uses various interfaces and lines to connect various parts of the entire display terminal. The processor 401 executes various functions of the display terminal and processes data by running or loading applications stored in the memory 402 and calling data stored in the memory 402, thereby performing overall monitoring of the display terminal.

In some embodiments, according to the following operations, the processor 401 in the display terminal 400 will load instructions corresponding to processes of one or more applications into the memory 402, and the processor 401 will run the applications stored in the memory 402 to achieve various functions. The operations include:

obtaining one or more gamma voltages respectively corresponding to one or more first binding points as one or more first gamma voltages, the first binding points being binding points of an extreme grey scale of the display panel;

obtaining one or more gamma voltages respectively corresponding to one or more second binding points as one or more second gamma voltages, the second binding points being binding points of a secondary grey scale of the display panel, where the secondary grey scale is adjacent to the extreme grey scale in a preset display grey scale table;

adjusting the gamma voltages corresponding to the second binding points based on the first gamma voltages and the second gamma voltages to obtain one or more target gamma voltages of the second binding points; and adjusting a grey scale value of the extreme grey scale in a preset grey scale-accurate color capture look-up table (ACC LUT) of the display panel, so that a brightness value of the secondary grey scale in the preset grey scale-ACC LUT reaches a target brightness value, the target brightness value being a brightness value of the extreme grey scale.

Figure 8:
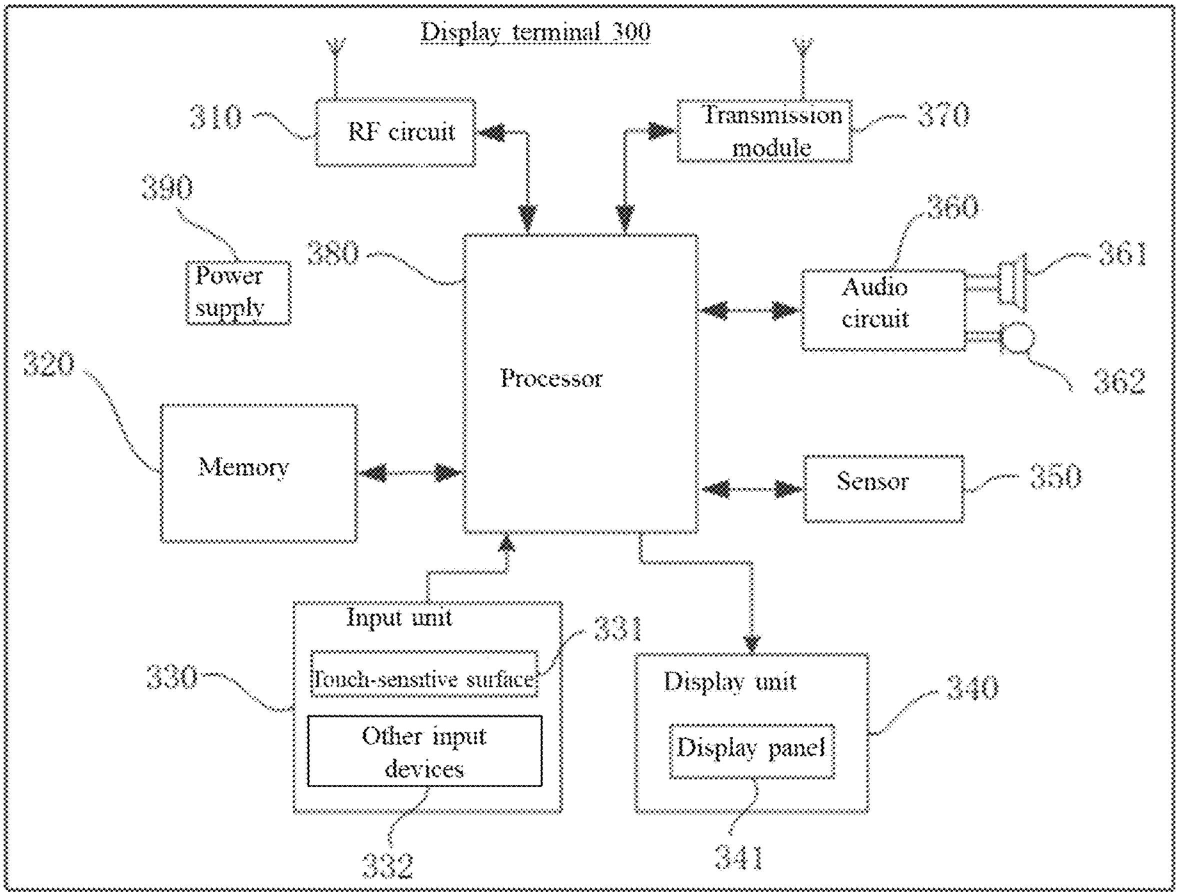
FIG. 8 is a block diagram of another display terminal according to some embodiments of the present disclosure.
Figure 9:
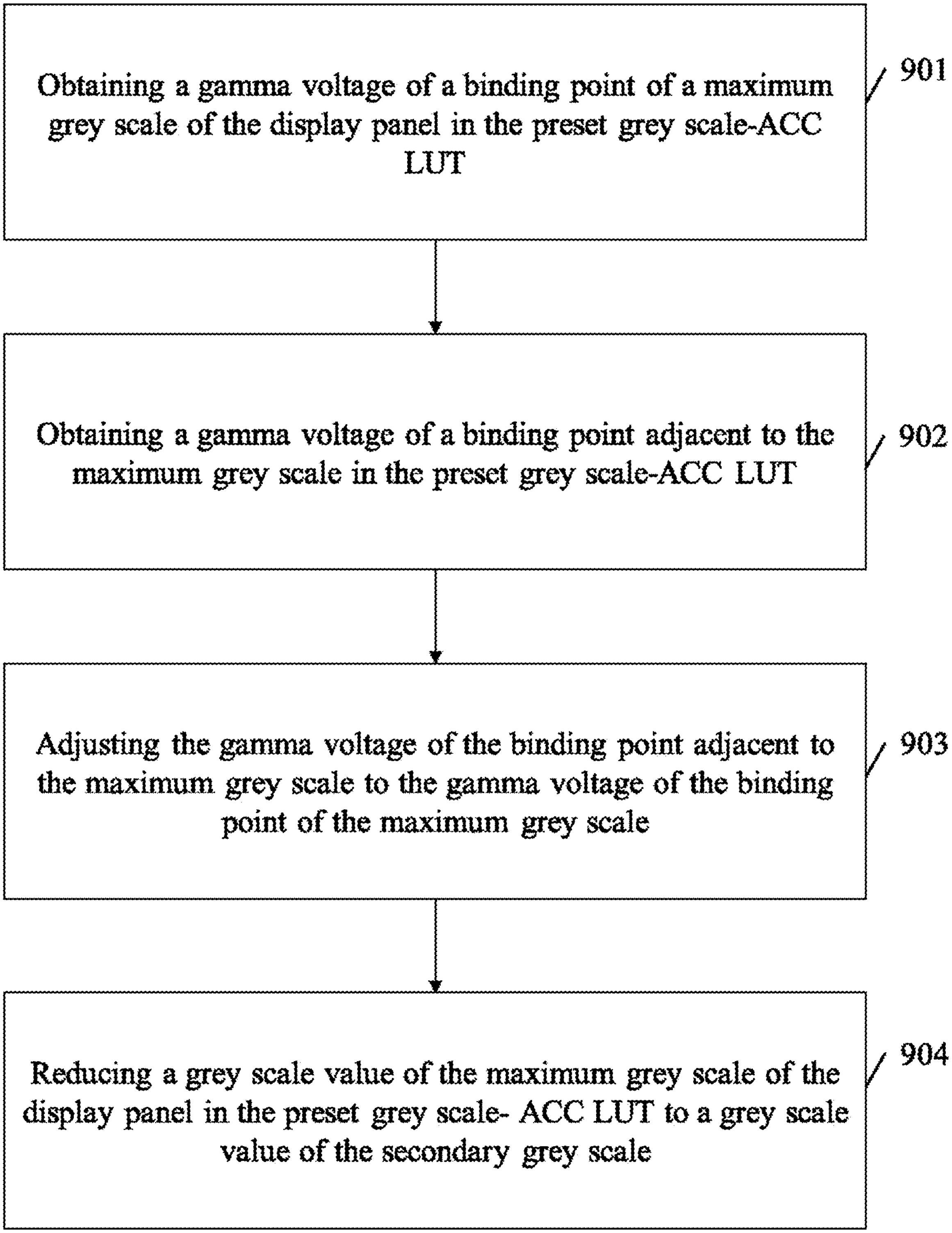
FIG. 9 is a schematic flowchart of another adjustment method of a display panel according to some embodiments of the present disclosure.
Figure 10:
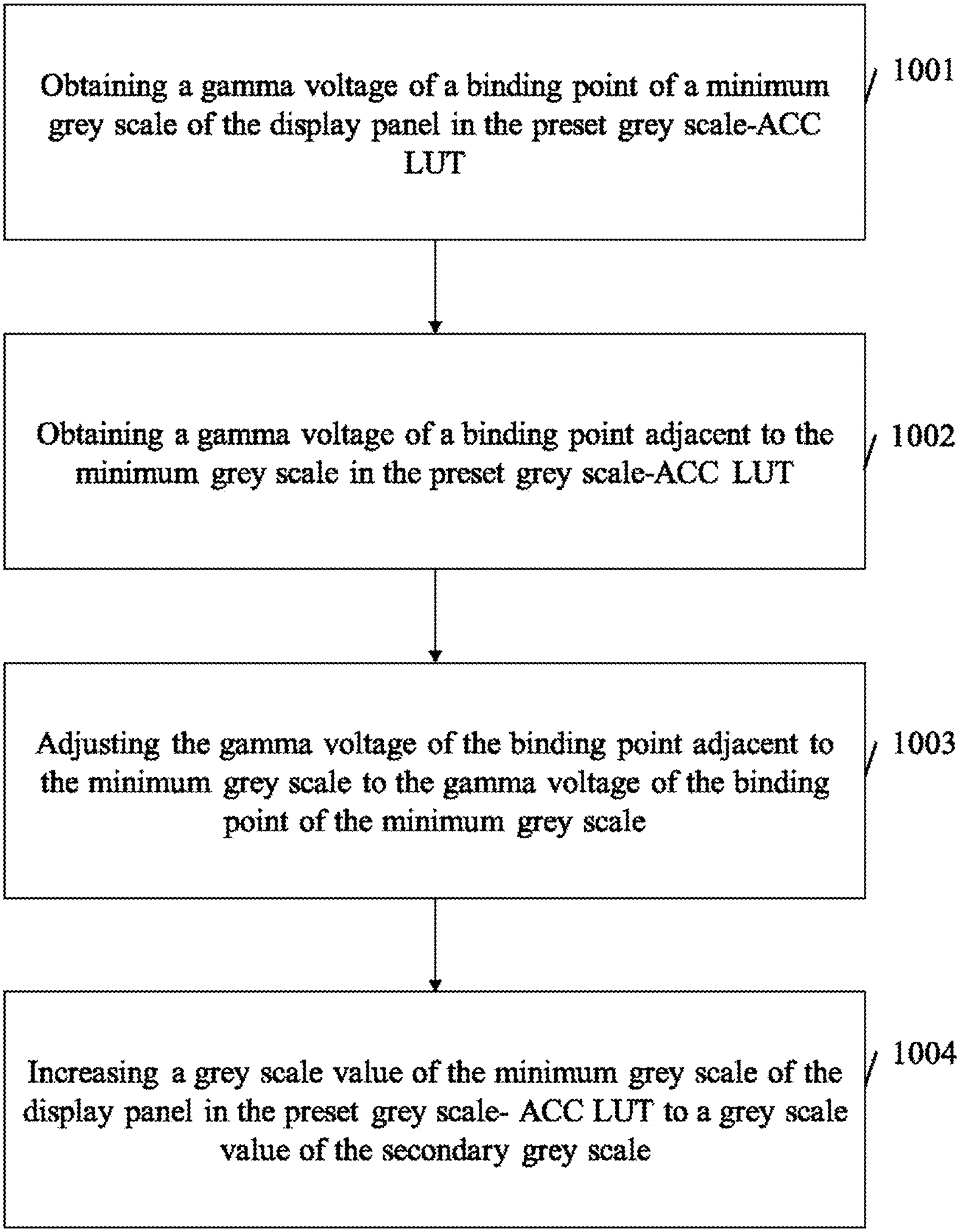
FIG. 10 is a schematic flowchart of still another adjustment method of a display panel according to some embodiments of the present disclosure.

Please refer to FIG. 8, FIG. 8 is a block diagram of another display terminal according to some embodiments of the present disclosure. The display terminal 300 may include a radio frequency (RF) circuit 310, a memory 320 including one or more computer-readable storage media, an input unit 330, a display unit 340, a sensor 350, an audio circuit 360, a speaker 361, a microphone 362, a transmission module 370, a processor 380 including one or more processing cores, a power supply 390 and other components. Those skilled in the art can understand that the structure of the display terminal does not constitute a limitation on the display terminal, and may include more or fewer components than those shown in the figures, or has certain components combined, or arrange different components.

The RF circuit 310 is used to receive and send electromagnetic waves, realize mutual conversion of electromagnetic waves and electrical signals, and thereby communicating with communication networks or other devices. The RF circuit 310 may include a variety of existing circuit elements for performing these functions, such as antennas, radio frequency transceivers, digital signal processors, encryption/decryption chips, Subscriber Identity Module (SIM) cards, memory, or the like. The RF circuit 310 can communicate with various networks such as the Internet, an intranet, a wireless network, or communicate with other devices through the wireless network. The above-mentioned wireless network may include a cellular telephone network, a wireless local area network or a metropolitan area network. The above-mentioned wireless networks can use various communication standards, protocols, and technologies, including but not limited to Global System for Mobile Communication (GSM), Enhanced Data GSM Environment (EDGE), Wideband Code Division Multiple Access (WCDMA), Code Division Access (CDMA), Time Division Multiple Access (TDMA), Wireless Fidelity (Wi-Fi) (such as the Institute of Electrical and Electronics Engineers standards IEEE 802.11a, IEEE 802.11b, IEEE802.11g and/or IEEE 802.11n), Voice over Internet Protocol (VoIP), Worldwide Interoperability for Microwave Access (Wi-Max), other protocols for email, instant messaging, and short messaging, and any other suitable communications protocols, even those that have not yet been developed.

The memory 320 may be used to store software programs and modules. The processor 380 executes the software programs and modules stored in the memory 320 to perform various functional applications and data processing, that is, to realize the function of automatically compensating light for taking pictures with a front camera. The memory 320 may include a high-speed random-access memory, and may also include a non-volatile memory, such as one or more magnetic storage devices, a flash memory, or other non-volatile solid-state memories. In some examples, the memory 320 may further include memories located remotely relative to the processor 380, and these remote memories may be connected to the display terminal 300 through a network. Examples of the above-mentioned network include but is not limited to the Internet, intranets, local area networks, mobile communication networks, and a combination thereof.

The input unit 330 may be used to receive input numeric or character information, and to generate keyboard, mouse, joystick, optical or trackball signal input related to user settings and function control. In some embodiments, the input unit 330 may include a touch-sensitive surface 331 and other input devices 332. The touch-sensitive surface 331, also known as a touch display or a touchpad, can collect a user's touch operation (e.g., an operation of the user on or near the touch-sensitive surface 331 using any suitable object or accessory such as a finger, a stylus, etc.) of the user on or near the touch-sensitive surface 331, and drive a corresponding connection device according to a preset program. Alternatively, the touch-sensitive surface 331 may include two parts: a touch detection device and a touch controller. The touch detection device detects an orientation of the user's touch operation, detects a signal brought by the touch operation, and transmits the signal to the touch controller. The touch controller receives touch information from the touch detection device, converts it into a contact point coordinate, and then sends to the processor 380, and can receive a command sent by the processor 380 and execute the command. In addition, the touch-sensitive surface 331 may be implemented using various types such as resistive, capacitive, infrared, and surface acoustic wave. In addition to the touch-sensitive surface 331, the input unit 330 may also include other input devices 332. In some embodiments, other input devices 332 may include, but are not limited to, one or more of a physical keyboard, a function key (e.g., a volume control key, a switch key), a trackball, a mouse, joystick, etc.

The display unit 340 may be used to display information input by the user or information provided to the user and display various graphical user interfaces of the terminal 300, which may be composed of graphics, text, icons, videos, and any combination thereof. The display unit 340 may include the above-mentioned display panel 341. Alternatively, the display panel 341 may be configured in a form of a Liquid Crystal Display (LCD), an Organic Light-Emitting Diode (OLED), etc. Further, the touch-sensitive surface 331 can cover the display panel 341. When the touch-sensitive surface 331 detects the touch operation on or near the display panel 341, and sends to the processor 380 to determine a type of an event of the touch operation. The processor 380 then provides a corresponding visual output on display panel 341 based on the type of the event of the touch operation. Although the touch-sensitive surface 331 and the display panel 341 are shown as two independent components to implement the input and output functions, in some embodiments, the touch-sensitive surface 331 and the display panel 341 can be integrated to implement the input and output functions.

The display terminal 300 may also include at least one sensor 350, such as a light sensor, a motion sensor, and other sensors. In some embodiments, the light sensor may include an ambient light sensor and a proximity sensor. The ambient light sensor may adjust brightness of the display panel 341 according to brightness of the ambient light. The proximity sensor may close the display panel 341 and/or backlight when the display terminal 300 moves to the ear. As a kind of motion sensor, the gravity acceleration sensor can detect the magnitude of acceleration in various directions (usually three axes), can detect the magnitude and direction of gravity when the display panel 300 is stationary, and can be applied to applications (e.g., switching between horizontal and vertical screens, related games, magnetometer attitude calibration) for identifying a mobile phone posture, vibration recognition related functions (e.g., pedometer, knock), etc. The display terminal 300 may also be configured with other sensors such as a gyroscope, a barometer, a hygrometer, a thermometer, an infrared sensor, etc., which will not be repeated herein.

On one hand, the microphone 362 may provide an audio interface between the user and the display terminal 300. The audio circuit 360 may transmit an electrical signal converted from received audio data to the speaker 361, and the speaker 361 may convert it into a sound signal for output. On the other hand, the microphone 362 may convert a collected sound signal into an electrical signal, and the audio circuit 360 may receive the electrical signal and convert into audio data, and output the audio data to the processor 380 or to the memory 320 for further processing. The processor 380 may process the audio data and send the processed audio data to, for example, another terminal through the RF circuit 310. The audio circuit 360 may also include an earphone jack to provide communication between peripheral earphones and the display terminal 300.

The display terminal 300 may help the user to send and receive emails, browse web pages, access streaming media, etc., through the transmission module 370 (e.g., a Wi-Fi module), which provides the user with wireless broadband Internet access. Although the transmission module 370 is shown in the figure, it should be understood that it is not a necessary component of the display terminal 300 and may be omitted as needed without changing the essence of the invention.

The processor 380 is a control center of the display terminal 300, using various interfaces and lines to connect various parts of the entire mobile phone, by running or executing software programs and/or modules stored in the memory 320, and calling data stored in the memory 320, execute various functions of the display terminal 300 and process data, thereby overall monitoring of the mobile phone. Alternatively, the processor 380 may include one or more processing cores. In some embodiments, the processor 380 may integrate an application processor and a modem processor. The application processor mainly processes an operating system, a user interface, and an application, etc. The modem processor mainly processes wireless communications. It should be understood that the above modem processor may not be integrated into the processor 380.

The display terminal 300 also includes a power supply 390 (such as a battery) that supplies power to various components. In some embodiments, the power supply may be logically connected to the processor 380 through a power management system to manage charging, discharging, and power consumption management through the power management system. The power supply 390 may also include one or more direct current (DC) or alternating current (AC) power supplies, recharging systems, power failure detection circuits, power converters or inverters, power status indicators, and other arbitrary components.

Although not shown, the display terminal 300 may also include a camera (such as a front camera, a rear camera), a Bluetooth module, etc., which will not be described herein. In some embodiments, the display unit of the display terminal is a touch screen display. The display terminal also includes a memory and one or more programs. The one or more programs are stored in the memory and are configured to be executed by the above processor to perform the following operations:

obtaining one or more gamma voltages respectively corresponding to one or more first binding points as one or more first gamma voltages, the first binding points being binding points of an extreme grey scale of the display panel;

obtaining one or more gamma voltages respectively corresponding to one or more second binding points as one or more second gamma voltages, the second binding points being binding points of a secondary grey scale of the display panel, where the secondary grey scale is adjacent to the extreme grey scale in a preset display grey scale table;

adjusting the gamma voltages corresponding to the second binding points based on the first gamma voltages and the second gamma voltages to obtain one or more target gamma voltages of the second binding points; and adjusting a grey scale value of the extreme grey scale in a preset grey scale-accurate color capture look-up table (ACC LUT) of the display panel, so that a brightness value of the secondary grey scale in the preset grey scale-ACC LUT reaches a target brightness value, the target brightness value being a brightness value of the extreme grey scale.

During specific implementation, each of the above modules may be implemented as an independent entity, or can be combined in any way and implemented as one or more entities. For the specific implementation of each of the above modules, please refer to the previous method embodiments, and will not be repeated herein.

Those of ordinary skill in the art can understand that all or part of the operations in the various methods of the above embodiments can be completed by instructions, or by controlling relevant hardware through the instructions. The instructions can be stored in a computer-readable storage medium, and loaded and executed by the processor. To this end, some embodiments of the present disclosure provide a storage medium in which a plurality of instructions are stored, and the instructions can be loaded by a processor to execute the operations in any of the display panel adjustment methods provided by some embodiments of the present disclosure.

The storage medium may include: a read only memory (ROM), a random-access memory (RAM), a magnetic disk, an optical disk, etc.

Since the instructions stored in the storage medium may execute the operations in any of the display panel adjustment methods provided by the embodiment of the present disclosure, therefore, any of the display panel adjustment methods provided by some embodiments of the present disclosure can be implemented. The beneficial effects that can be achieved are detailed in the previous embodiments and will not be repeated herein.

For the specific implementation of each of the above operations, please refer to the previous embodiments and will not be described again here.

What is claimed is:

1. An adjustment method of a display panel, comprising:

obtaining one or more gamma voltages respectively corresponding to one or more first binding points as one or more first gamma voltages, the first binding points being binding points of an extreme grey scale of the display panel;

obtaining one or more gamma voltages respectively corresponding to one or more second binding points as one or more second gamma voltages, the second binding points being binding points of a secondary grey scale of the display panel, wherein the secondary grey scale is adjacent to the extreme grey scale in a preset display grey scale table;

adjusting the one or more gamma voltages corresponding to the one or more second binding points based on the one or more first gamma voltages and the one or more second gamma voltages to obtain one or more target gamma voltages of the one or more second binding points; and adjusting a grey scale value of the extreme grey scale in a preset grey scale-accurate color capture look-up table (ACC LUT) of the display panel, so that a brightness value of the secondary grey scale in the preset grey scale-ACC LUT reaches a target brightness value, the target brightness value being a brightness value of the extreme grey scale.

2. The adjustment method of the display panel according to claim 1, wherein:

the extreme grey scale comprises a maximum grey scale of the display panel in the preset grey scale-ACC LUT;

the one or more first binding points comprise a binding point of the maximum grey scale of the display panel;

the one or more first gamma voltages comprise a gamma voltage of the binding point of the maximum grey scale;

the one or more second binding points comprise a binding point adjacent to the maximum grey scale of the display panel in the preset grey scale-ACC LUT; and the one or more second gamma voltages comprise a gamma voltage of the binding point adjacent to the maximum grey scale.

3. The adjustment method of the display panel according to claim 2, wherein the adjusting of the one or more gamma voltages corresponding to the one or more second binding points based on the one or more first gamma voltages and the one or more second gamma voltages comprises:

adjusting the gamma voltage of the binding point adjacent to the maximum grey scale to the gamma voltage of the binding point of the maximum grey scale.

4. The adjustment method of the display panel according to claim 3, wherein the adjusting of the grey scale value of the extreme grey scale in the preset grey scale-ACC LUT of the display panel comprises:

reducing a grey scale value of the maximum grey scale of the display panel in the preset grey scale-ACC LUT to a grey scale value of the secondary grey scale.

5. The adjustment method of the display panel according to claim 1, wherein:

the extreme grey scale comprises a minimum grey scale of the display panel in the preset grey scale-ACC LUT;

the one or more second binding points comprise a binding point of the minimum grey scale of the display panel;

the one or more second gamma voltages comprise a gamma voltage of the binding point of the minimum grey scale;

the one or more first binding points comprise a binding point adjacent to the minimum grey scale of the display panel in the preset grey scale-ACC LUT; and the one or more first gamma voltages comprise a gamma voltage of the binding point adjacent to the minimum grey scale.

6. The adjustment method of the display panel according to claim 5, wherein the adjusting of the one or more gamma voltages corresponding to the one or more second binding points based on the one or more first gamma voltages and the one or more second gamma voltages, comprises:

adjusting the gamma voltage of the binding point adjacent to the minimum grey scale to the gamma voltage of the binding point of the minimum grey scale.

7. The adjustment method of the display panel according to claim 6, wherein the adjusting of the grey scale value of the extreme grey scale in the preset grey scale-ACC LUT of the display panel comprises:

increasing a grey scale value of the minimum grey scale of the display panel in the preset grey scale-ACC LUT to a grey scale value of the secondary grey scale.

8. The adjustment method of the display panel according to claim 1, wherein:

the one or more first binding points each correspond to a first binding point value, and the one or more second binding points each correspond to a second binding point value;

the one or more first binding points and the one or more second binding points form one or more binding point pairs, wherein the one or more binding point pairs each comprise one first binding point and one second binding point; and the adjusting of the one or more gamma voltages corresponding to the one or more second binding points based on the one or more first gamma voltages and the one or more second gamma voltages comprises:

determining the one or more binding point pairs, wherein in each of the one or more binding point pairs, an absolute value of a difference between the first binding point value corresponding to the first binding point and the second binding point value corresponding to the second binding point equals to 1; and adjusting, for each of the one or more binding pairs, the gamma voltage value of the second binding point to the gamma voltage of the first binding point.

9. The adjustment method of the display panel according to claim 1, wherein the preset display grey scale table has grey scales arranged in an order that magnitudes of the grey scale values of the grey scales increase/decrease at a preset step size.

10. The adjustment method of the display panel according to claim 9, wherein a difference between the grey scale values of the secondary grey scale and the extreme grey scale equals to the preset step size.

11. The adjustment method of the display panel according to claim 1, wherein in the preset grey scale-ACC LUT of the display panel, each of the grey scale values corresponds to a brightness value.

12. A control chip, comprising:

a communication interface, configured to obtain one or more gamma voltages respectively corresponding to one or more first binding points as one or more first gamma voltages and one or more gamma voltages respectively corresponding to one or more second binding points as one or more second gamma voltages, wherein the first binding points are binding points of an extreme grey scale of the display panel, and the second binding points are binding points of a secondary grey scale of the display panel, the secondary grey scale being adjacent to the extreme grey scale in a preset display grey scale table; and a control circuit, configured to adjust the one or more gamma voltages corresponding to the one or more second binding points based on the one or more first gamma voltages and the one or more second gamma voltages to obtain one or more target gamma voltages of the one or more second binding points, and to adjust a grey scale value of the extreme grey scale in a preset grey scale-accurate color capture look-up table (ACC LUT) of the display panel, so that a brightness value of the secondary grey scale in the preset grey scale-ACC LUT reaches a target brightness value, the target brightness value being a brightness value of the extreme grey scale.

13. A display terminal, comprising:

a display panel;

a processor; and a memory electrically connected to the processor and storing a plurality of application programs;

wherein the processor is configured to execute the application programs to implement an adjustment method of the display panel comprising:

obtaining one or more gamma voltages respectively corresponding to one or more first binding points as one or more first gamma voltages, the first binding points being binding points of an extreme grey scale of the display panel;

obtaining one or more gamma voltages respectively corresponding to one or more second binding points as one or more second gamma voltages, the second binding points being binding points of a secondary grey scale of the display panel, wherein the secondary grey scale is adjacent to the extreme grey scale in a preset display grey scale table;

adjusting the one or more gamma voltages corresponding to the one or more second binding points based on the one or more first gamma voltages and the one or more second gamma voltages to obtain one or more target gamma voltages of the one or more second binding points; and adjusting a grey scale value of the extreme grey scale in a preset grey scale-accurate color capture look-up table (ACC LUT) of the display panel, so that a brightness value of the secondary grey scale in the preset grey scale-ACC LUT reaches a target brightness value, the target brightness value being a brightness value of the extreme grey scale.

14. The display terminal according to claim 13, wherein:

the extreme grey scale comprises a maximum grey scale of the display panel in the preset grey scale-ACC LUT;

the one or more first binding points comprise a binding point of the maximum grey scale of the display panel;

the one or more first gamma voltages comprise a gamma voltage of the binding point of the maximum grey scale;

the one or more second binding points comprise a binding point adjacent to the maximum grey scale of the display panel in the preset grey scale-ACC LUT; and the one or more second gamma voltages comprise a gamma voltage of the binding point adjacent to the maximum grey scale.

15. The display terminal according to claim 14, wherein the adjusting of the one or more gamma voltages corresponding to the one or more second binding points based on the one or more first gamma voltages and the one or more second gamma voltages comprises:

adjusting the gamma voltage of the binding point adjacent to the maximum grey scale to the gamma voltage of the binding point of the maximum grey scale.

16. The display terminal according to claim 15, wherein the adjusting of the grey scale value of the extreme grey scale in the preset grey scale-ACC LUT of the display panel comprises:

reducing a grey scale value of the maximum grey scale of the display panel in the preset grey scale-ACC LUT to a grey scale value of the secondary grey scale.

17. The display terminal according to claim 13, wherein:

the extreme grey scale comprises a minimum grey scale of the display panel in the preset grey scale-ACC LUT;

the one or more second binding points comprise a binding point of the minimum grey scale of the display panel;

the one or more second gamma voltages comprise a gamma voltage of the binding point of the minimum grey scale;

the one or more first binding points comprise a binding point adjacent to the minimum grey scale of the display panel in the preset grey scale-ACC LUT; and the one or more first gamma voltages comprise a gamma voltage of the binding point adjacent to the minimum grey scale.

18. The display terminal according to claim 17, wherein the adjusting of the one or more gamma voltages corresponding to the one or more second binding points based on the one or more first gamma voltages and the one or more second gamma voltages, comprises:

adjusting the gamma voltage of the binding point adjacent to the minimum grey scale to the gamma voltage of the binding point of the minimum grey scale.

19. The display terminal according to claim 18, wherein the adjusting of the grey scale value of the extreme grey scale in the preset grey scale-ACC LUT of the display panel comprises:

increasing a grey scale value of the minimum grey scale of the display panel in the preset grey scale-ACC LUT to a grey scale value of the secondary grey scale.

20. The display terminal according to claim 13, wherein:

the one or more first binding points each correspond to a first binding point value, and the one or more second binding points each correspond to a second binding point value;

the one or more first binding points and the one or more second binding points form one or more binding point pairs, wherein the one or more binding point pairs each comprise one first binding point and one second binding point; and the adjusting of the one or more gamma voltages corresponding to the one or more second binding points based on the one or more first gamma voltages and the one or more second gamma voltages comprises:

determining the one or more binding point pairs, wherein in each of the one or more binding point pairs, an absolute value of a difference between the first binding point value corresponding to the first binding point and the second binding point value corresponding to the second binding point equals to 1; and adjusting, for each of the one or more binding pairs, the gamma voltage value of the second binding point to the gamma voltage of the first binding point.

* * * * *